(12) United States Patent
Agrawal et al.

(10) Patent No.: US 12,542,852 B2
(45) Date of Patent: Feb. 3, 2026

(54) ROUTING INCOMING CALLS USING ULTRA WIDE BAND ENABLED DEVICES

(71) Applicant: MOTOROLA MOBILITY LLC, Wilmington, DE (US)

(72) Inventors: Amit Kumar Agrawal, Bangalore (IN); Rohit Sisodia, Naperville, IL (US); Michael E Russell, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 312 days.

(21) Appl. No.: 18/479,016

(22) Filed: Sep. 30, 2023

(65) Prior Publication Data

US 2025/0112990 A1 Apr. 3, 2025

(51) Int. Cl.
*H04M 3/42* (2006.01)
*H04M 1/72457* (2021.01)
*H04B 1/69* (2011.01)

(52) U.S. Cl.
CPC ... *H04M 3/42068* (2013.01); *H04M 1/72457* (2021.01); *H04B 1/69* (2013.01)

(58) Field of Classification Search
CPC ......... H04M 3/42068; H04M 1/72457; H04M 1/72412; H04B 1/69
USPC ........................................................ 455/415
See application file for complete search history.

(56) References Cited

U.S. PATENT DOCUMENTS

| | | | |
|---|---|---|---|
| 2006/0093121 A1* | 5/2006 | Sylvain ................. | H04W 4/029 379/220.01 |
| 2011/0223978 A1* | 9/2011 | Chu .................... | H04M 1/6075 455/567 |
| 2012/0088476 A1* | 4/2012 | Greenfield ........ | H04M 1/72457 455/414.1 |
| 2017/0111498 A1* | 4/2017 | Cody ................ | H04M 3/42059 |
| 2021/0006652 A1* | 1/2021 | Ledvina .................. | H04L 51/58 |

* cited by examiner

*Primary Examiner* — Don N Vo
(74) *Attorney, Agent, or Firm* — Isidore PLLC

(57) ABSTRACT

A computing device, a method and a computer program product for routing incoming calls received by the computing device to at least one ultra-wideband (UWB) enabled display device. The method includes detecting an incoming call and identifying a user having a user profile associated with the incoming call. The method further includes determining a location of each display device and the user relative to the location of the computing device, based on UWB ranging between the computing device and the display devices, and at least one of a user-associated UWB tag and a user device. The method further includes identifying a first display device that is closest to the location of the user and determining if the user profile is active on the first display device. In response to determining that the user profile is active on the first display device, routing the incoming call to the first display device.

20 Claims, 9 Drawing Sheets

ROUTING INCOMING CALLS USING ULTRA WIDE BAND ENABLED DEVICES

BACKGROUND

1. Technical Field

The present disclosure generally relates to distributed computing systems and in particular to distributed computing systems that include ultra wideband enabled devices.

2. Description of the Related Art

Distributed computer systems are widely used for processing, storing and displaying data and information. Distributed computer systems enable multiple devices to access shared resources and shared data, via one or more network connections. Distributed computer systems offer improved access to computing power and resources. Ultra wideband is a technology for transmitting information across a wide bandwidth that allows for the transmission of signal energy without interfering with other electronic signals. Ultra wideband technology can be used for precise location determination and position tracking.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
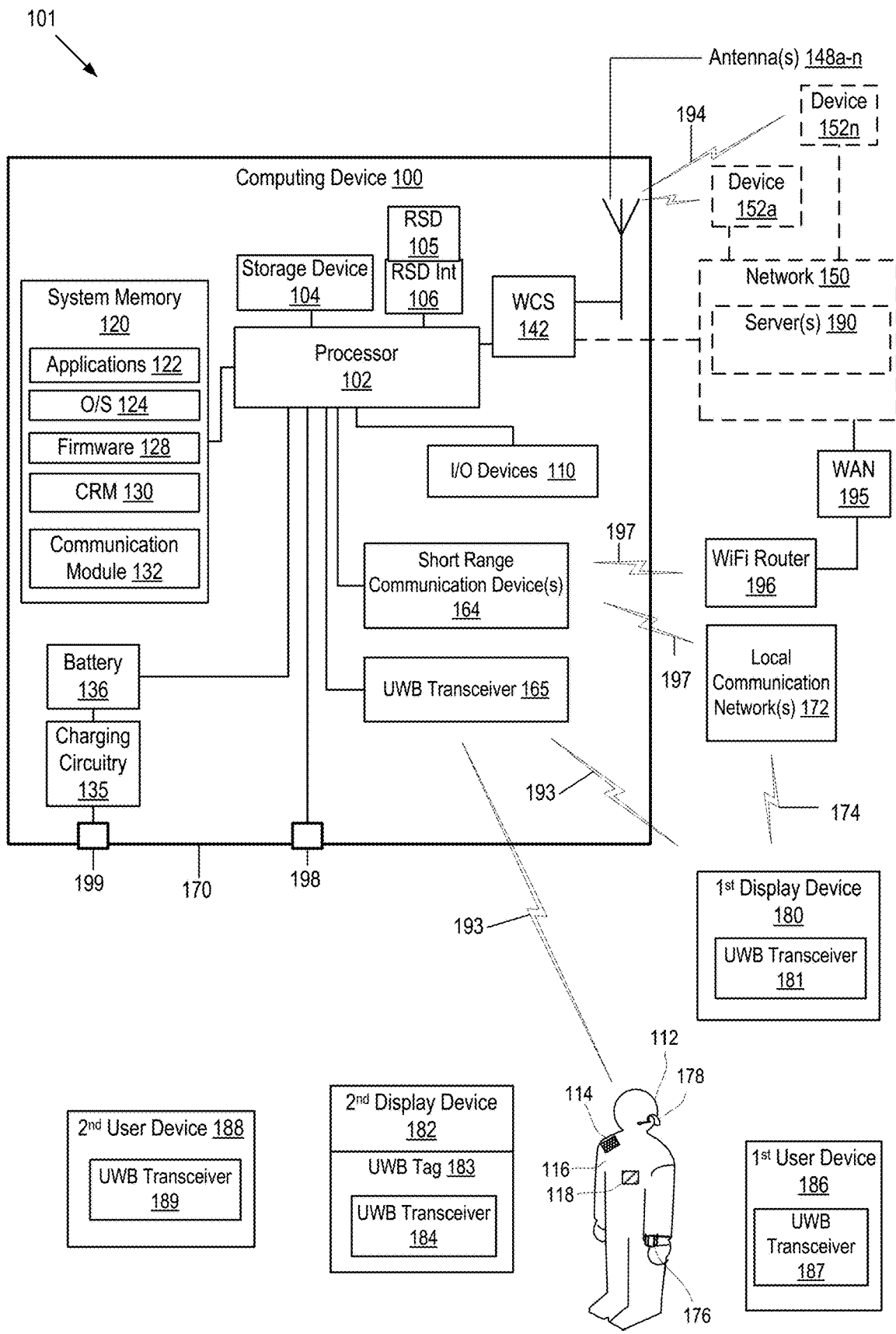
FIG. 1 depicts an example distributed computing environment having a computing device and a plurality of distributed ultra wideband (UWB)-enabled user devices and output devices, and within which various aspects of the disclosure can be implemented, according to one or more embodiments.

According to one aspect of the disclosure, the illustrative embodiments provide a computing device, a method, and a computer program product for routing incoming calls received by the computing device to at least one ultra-wideband (UWB) enabled (or tagged) display device. In a first embodiment, a computing device includes a communication subsystem, a first UWB transceiver, and a memory having stored thereon a call routing module for routing incoming calls received by the computing device to at least one UWB-enabled display device. The computing device further includes at least one processor that is communicatively coupled to the communication subsystem, the first UWB transceiver, and the memory. The at least one processor executes program code of the call routing module, which enables the computing device to detect an incoming call and identify a first user having a first user profile associated with the incoming call. The at least one processor further determines a first location of the first user relative to a second location of the computing device, based on UWB ranging between the computing device and at least one of a user-associated UWB tag or a UWB-enabled user device (or user device having a co-located UWB tag) that is located on, or in proximity to, the first user. The at least one processor further determines, based on UWB ranging between the computing device and each of a plurality of display devices that are UWB-location-enabled (i.e., including a UWB device or having a UWB tag co-located with the display), a respective location of each of the plurality of display devices relative to the first location of the user (or user device). The at least one processor further identifies, from among the plurality of display devices, a first display device that is closest to the first location of the user, based on the respective location of each of the plurality of display devices relative to the first location of the user device. The at least one processor further determines if the first user profile is associated with (or linked to) the first display device and, in response to determining that the first user profile is associated (or linked to) with the first display device, routes the incoming call to the first display device.

According to a second embodiment of the disclosure, the method includes detecting, via at least one processor of a computing device, an incoming call and identifying a first user having a first user profile associated with the incoming call. The method further includes determining, a first location of the first user relative to a second location of the computing device, based on ultra-wideband (UWB) ranging between the computing device and at least one of a user-associated UWB tag or a user device that is UWB-location-enabled (or having a co-located UWB tag), and is on, or in proximity to, the first user. The method further includes determining, based on UWB ranging between the computing device and each of a plurality of display devices that are UWB-location-enabled, a respective location of each of the plurality of display devices relative to the first location of the user device. The method further includes identifying, from among the plurality of display devices, a first display device that is closest to the first location of the user device, based on the respective location of each of the plurality of display devices relative to the first location of the user device. The method further includes determining if the first user profile is associated with (or linked to) the first display device, and in response to determining that the first user profile is associated with (or linked to) the first display device, routing the incoming call to the first display device.

According to an additional embodiment, a computer program product includes a computer readable storage device having stored thereon program code that, when executed by at least one processor of a computing device having a communication subsystem and a first UWB transceiver, the program code enables the computing device to complete the functionality of the above-described method processes.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within computing device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts an example distributed computing environment 101 having a computing device and a plurality of distributed ultra wideband (UWB)-enabled user devices and output devices, within which various aspects of the disclosure can be implemented, according to one or more embodiments. Computing device 100 can be various types of computing devices that support communication with one or more display devices. In one embodiment, computing device 100 provides computing resources for content presentation companion devices such as various display devices, as will be described below. Computing device 100 can perform processing operations and render content, while the display devices present content to one or more users and serves as a user interface.

Computing device 100 includes processor 102. As illustrated, processor 102 is communicatively coupled to storage device 104, system memory 120, input/output (I/O) devices 110, and various communication devices (introduced and described later). While shown as having direct connections to processor 102, it is appreciated that in other configurations, the connections by these components to processor can be via a system interlink and one or more intermediate devices. Processor 102 can include processor resources, such as a central processing unit (CPU), one or more graphics processing units (GPU) and one or more digital signal processors (DSP), that collectively support computing, classifying, processing, and transmitting and receiving of data and information, including through wireless and wired communication.

System memory 120 may be a combination of volatile and non-volatile memory, such as random access memory (RAM) and read-only memory (ROM). System memory 120 can store program code or similar data associated with applications 122, an operating system 124, firmware 128, call routing module (CRM) 130, and communication module 132. CRM 130 includes program code that is executed by processor 102 to enable computing device 100 to identify a location of one or more UWB-enabled display devices relative to a person receiving an incoming call and to route incoming calls received by the computing device to at least one identified UWB-enabled display device in closest visual proximity to the person. Communication module 132 includes program code that is executed by processor 102 to enable computing device 100 to communicate with other external devices and systems. Although depicted as being separate from applications 122, CRM 130, and communication module 132 may be each implemented as an application. Processor 102 executes program code stored in system memory 120, including program code associated with applications 122, CRM 130, and communication module 132 to provides the various features and functions described herein.

In one or more embodiments, computing device 100 includes removable storage device (RSD) 105, which is inserted into an RSD interface 106 that is communicatively coupled via system interlink to processor 102. In one or more embodiments, RSD 105 is a non-transitory computer program product or computer readable storage device. RSD 105 may have a version of CRM 130 stored thereon, in addition to other program code. Processor 102 can access RSD 105 to provision computing device 100 with program code that, when executed by processor 102, the program code causes or configures computing device 100 to provide the functionality described herein.

I/O devices 110 can include keyboards, pointing devices, and displays, which can be configured with touch screen functionality. I/O devices 110 can be utilized to enable programming of the computing device with a list of available second devices and supported user profiles and to configure the network or direct connections by communication device to each of the second devices within distributed computing environment 101.

Computing device 100 can further include data port 198, power port 199, charging circuitry 135, and battery 136. Computing device 100 can receive power from an external power source via power port 199 to provide power to computing device 100 and to charge battery 136.

Computing device 100 further includes wireless communication subsystem (WCS) 142, which is coupled to antennas 148a-148n. In one or more embodiments, WCS 142 can include a communication module with one or more baseband processors or digital signal processors, one or more modems, and a radio frequency (RF) front end having one or more transmitters and one or more receivers. Wireless communication subsystem (WCS) 142 and antennas 148a-148n allow computing device 100 to communicate wirelessly with wireless (cellular) network 150 via transmissions of communication signals 194 to and from network communication devices 152a-152n, such as base stations or cellular nodes, of wireless network 150. In one embodiment, network communication devices 152a-152n contain electronic communication equipment to allow communication with computing device 100. In one embodiment, WCS 142 enables computing device 100 to receive incoming audio and/or video calls from wireless network 150.

In one or more embodiment, wireless network 150 can include one or more servers 190 that support wireless exchange of voice, data, and video and other communication with electronic device 100. In an embodiment, servers 190 of wireless network 150 support wireless exchange of e-mail, text, data, and other communication between electronic device 100 and other devices via wireless network 150.

Computing device 100 further includes short range communication device(s) 164, which is/are communicatively coupled to processor 102. Short range communication device(s) 164 is/are low powered transceiver(s) that can wirelessly communicate with other devices. Short range communication device 164 can include one or more of a variety of devices, such as a near field communication (NFC) device, a Bluetooth device, and/or a wireless fidelity (Wi-Fi) device.

Short range communication device(s) 164 are communicatively coupled with local communication network(s) 172 and WiFi router 196, via communication signals 197. In one embodiment, computing device 100 can communicate with local communication network(s) 172 and WiFi router 196 wirelessly via short range communication device 164. Wireless network 150 is communicatively coupled to wireless fidelity (WiFi) router 196 by a wide area network (WAN) 195, such as the Internet. Computing device 100 is thus also able to communicate wirelessly with wireless network 150 via communication signals 197 transmitted by short range communication device(s) 164 to and from WiFi router 196. In one embodiment, computing device 100 can receive internet or Wi-Fi based calls via short range communication device 164. Local communication network(s) 172 is communicatively coupled to one or more display devices, such as display device 180, via communication signals 174. Computing device 100 is thus also able to communicate wirelessly with display device 180 via local communication network(s) 172 using communication signals 174 and 197.

In an embodiment, WCS 142, antennas 148a-148n, and short-range communication device(s) 164 collectively provide communication interface(s) of computing device 100 and can be referred to as a communication sub-system of computing device 100. These communication interfaces enable computing device 100 to communicatively connect to at least one display device (e.g., first display device 180) via at least one network.

According to one aspect of the disclosure, computing device 100 further includes ultra-wideband (UWB) transceiver 165, which is communicatively coupled to processor 102. UWB transceivers enable precise location determination and tracking of other UWB or UWB-enabled devices. UWB transceiver 165 is a low powered short range transceiver that can wirelessly communicate with other UWB transceivers within a supported range of the UWB signal. Computing device 100 can communicate with embedded UWB devices or co-located UWB tags of a first display device 180 and a second display device 182, via UWB transceiver 165 in order to identify a location and distance of the respective first display device 180 and a second display device 182. First display device 180 can include an integrated UWB transceiver 181 such that computing device 100 and first display device 180 can wirelessly exchange UWB signals 193 via their respective UWB transceivers 165 and 181.

Second display device 182 can include UWB tag 183 that is attached to or in proximity of second display device 182.

UWB tag 183 is a separate device that can be attached to an article whose location is desired to be identified or tracked using UWB technology. With this co-location of the UWB tag 183, second display device 182 can be described as UWB-location-enabled, as opposed to being UWB-enabled with an embedded UWB device. UWB tag 183 includes a UWB transceiver 184, enabling computing device 100 to wirelessly exchange UWB signals 193 with UWB-location-enabled second display device 182 via their respective UWB transceivers, 165 and 184. For simplicity, throughout the description of the disclosure, the term UWB-enabled will be utilized to refer to both the devices having an embedded UWB device and devices with a co-located UWB tag (UWB-location-enabled devices).

Computing device 100 can further be communicatively coupled with a first user device 186 and a second user device 188, via UWB transceiver 165. First user device 186 and second user device 188, can be various user devices such as a smartphone, a user carried device, or a user-wearable device, such as a smart-watch or fitness tracker. First user device 186 can include UWB transceiver 187 such that computing device 100 and first user device 186 can wirelessly exchange UWB signals 193 via their respective UWB transceivers. Second user device 188 can include UWB transceiver 189 such that computing device 100 and second user device 188 can wirelessly exchange UWB signals 193 via their respective UWB transceivers.

UWB transceiver 165 can use one or more of antennas 148a-148n or can use an internal antenna structure to communicate. UWB transceiver 165 can wirelessly communicate with external UWB transceivers 181, 184, 187 and 189 via communication signals 193. Ultra wideband technology transmits information across a wide bandwidth that allows for the transmission of signal energy without interfering with carrier signals (i.e., communication signals 194 to and from network communication devices 152a-152n). UWB transceivers 181, 184, 187 and 189 can be used for precise location determination and position tracking, as will be described below.

Computing device 100 can further communicate with each of first display device 180, second display device 182, first user device 186 and second user device 188, via short range communication device(s) 164 and corresponding communication signals 197. In one embodiment, each of first display device 180, second display device 182, first user device 186 and second user device 188 can each include a respective short range communication device, as will be described below. In one embodiment, computing device 100 can route incoming calls to one of first display device 180, or second display device 182, via short range communication device(s) 164. Computing device 100 further includes housing 170 that contains/protects the components of computing device 100.

In one embodiment, a user/person 112 can have a user-associated UWB tag, such as UWB tag 114 affixed to clothing 116 or to an accessory worn by the user. In another embodiment, user/person 112 can be in possession of a UWB tag 118 (e.g., the tag can be stored in the user's pocket). User/person 112 is further shown wearing a user wearable device 176 that is UWB-enabled, such as a smart-watch, and also wearing an audio accessory 178 that is UWB-enabled, such as an ear-piece. The UWB-enabled user devices, tags, and audio accessory can be used to ascertain the precise location of user/person 112 and/or track the position of user/person 112 within an environment.

In the description of each of the following figures, reference is also made to specific components illustrated within the preceding figure(s). Similar components are presented with the same reference number.

Figure 2:
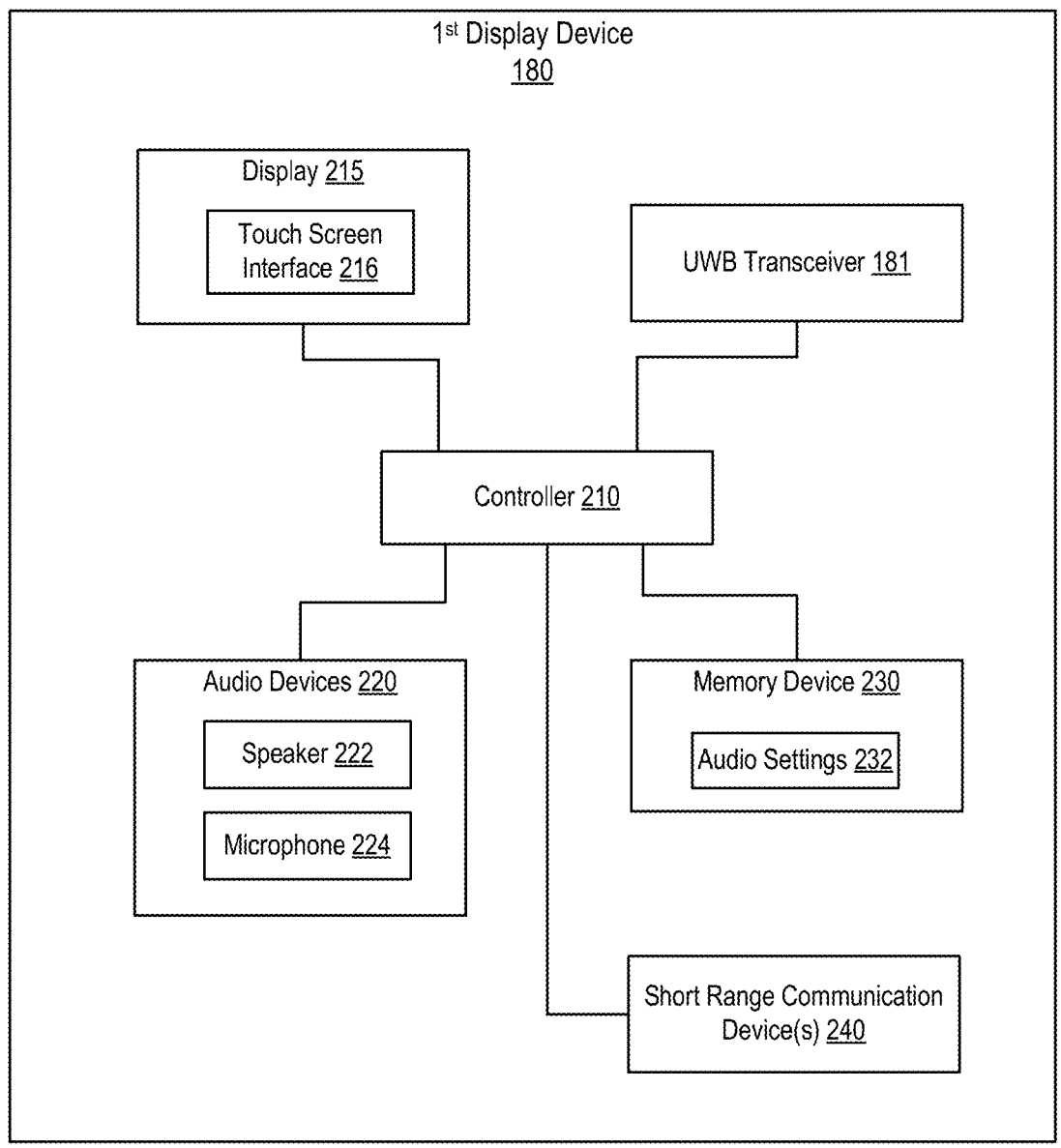
FIG. 2 depicts an example UWB-enabled display device, according to one or more embodiments.

FIG. 2 illustrates additional details of first display device 180. First display device 180 includes a controller 210. In one embodiment, controller 210 can be a micro-controller that supports operations and communications of first display device 180. Controller 210 is communicatively coupled to UWB transceiver 181, display 215, audio devices 220, memory device 230, and short range communication device(s) 240. UWB transceiver 181 can wirelessly exchange UWB signals 193 with UWB transceiver 165 of computing device 100. UWB transceivers 165 and 181 together can be used to determine the precise location/position of first display device 180 relative to computing device 100.

Display 215 can be one of a wide variety of display screens or devices, such as a liquid crystal display (LCD) and an organic light emitting diode (OLED) display. In some embodiments, display 215 can be a touch screen device that can receive user tactile/touch input. As a touchscreen device, display 215 includes a tactile, touchscreen interface 216 that allows a user to provide input to or to control first display device 180 by touching features presented within/below the display screen. Tactile, touch screen interface 216 can be utilized as an input device.

Audio devices 220 include an output device, such as speakers 222, for outputting audio, and an input device, such as microphone 224, for receiving audio input. Memory device 230 may be a combination of volatile and non-volatile memory, such as random access memory (RAM) and read-only memory (ROM). Memory device 230 can store audio settings 232. Audio settings 232 contain operating parameters/characteristics of audio devices 220. Audio settings 232 can specify if the display device includes a speaker and microphone or if the display device has an audio accessory device such as a headset or ear-buds currently enabled.

Short range communication device(s) 240 can wirelessly communicate with other devices, such as short range communication device 164 of computing device 100. Short range communication device 164 can include one or more of a variety of devices, such as a near field communication (NFC) device, a Bluetooth device, and/or a wireless fidelity (Wi-Fi) device. Short range communication device 240 enables first display device 180 to communicate with computing device 100 via communication signals 197. In one embodiment, first display device 180 can present an incoming call that has been routed to the display device, via short range communication device(s) 240. It is appreciated that, in one or more embodiments, second display device 182 can include similar components as those described for first display device 180.

Figure 3:
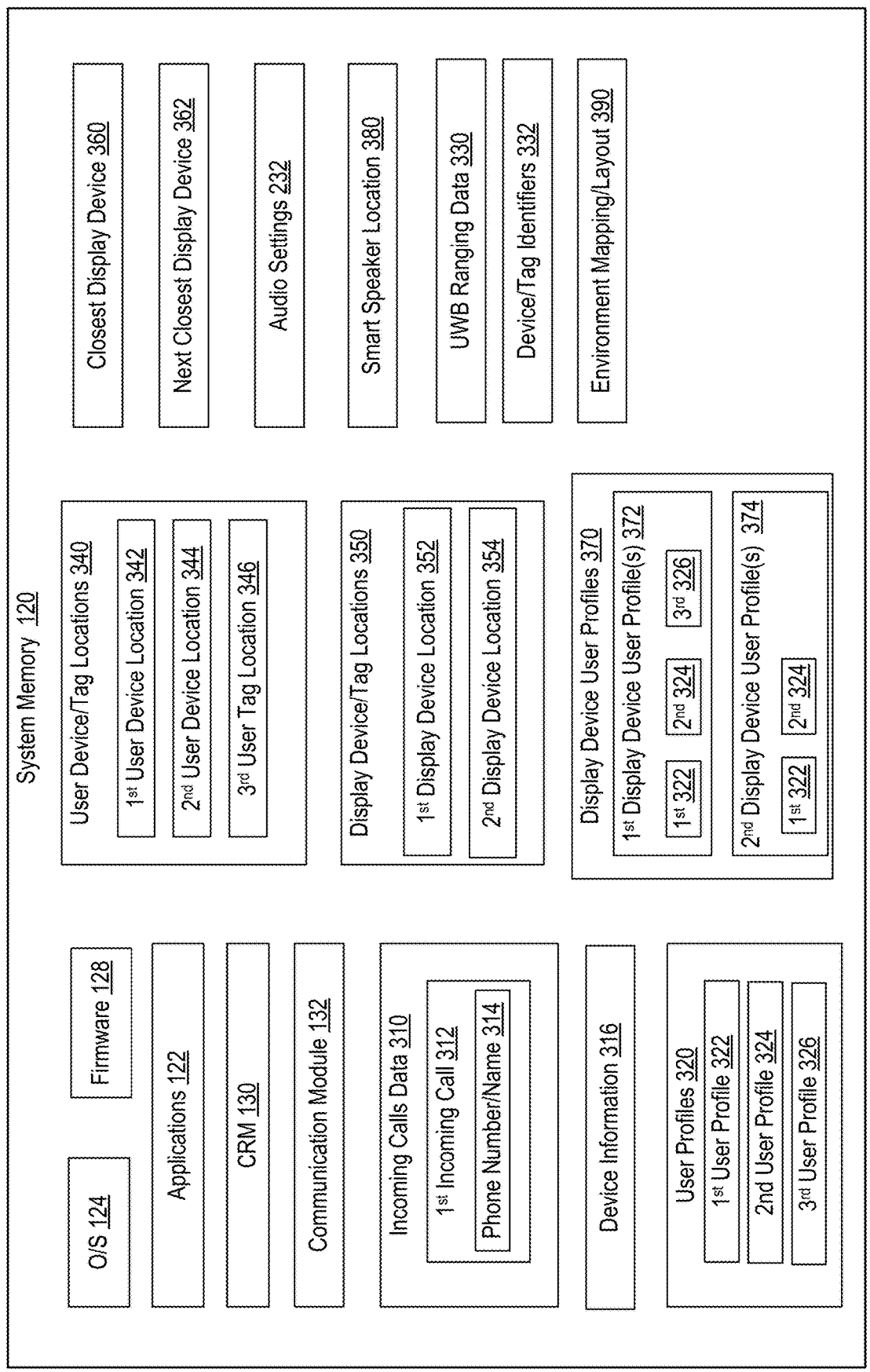
FIG. 3 is a block diagram of example contents of the system memory of the example computing device of FIG. 1, according to one or more embodiments.

Referring to FIG. 3, there is shown one embodiment of example contents of system memory 120 of computing device 100. System memory 120 includes data, software, and/or firmware modules, including applications 122, operating system 124, firmware 128, CRM 130, and communication module 132.

CRM 130 includes program code that is executed by processor 102 to enable computing device 100 to perform various features of the present disclosure. In one or more embodiments, execution of CRM 130 by processor 102 enables/configures computing device 100 to perform the processes presented in the flowcharts of FIGS. 7A-7B and 8 as will be described below. Communication module 132 enables computing device 100 to communicate with wireless network 150 and with other devices, such as display devices 180, 182 and user devices 186, 188.

System memory 120 further includes record of incoming calls data 310, device information 316, and user profiles 320. Computing device 100 can store a record of the incoming calls, received via wireless network 150 or via WiFi router 196, to record of incoming calls data 310. Incoming calls data 310 can include a first incoming call 312. First incoming call 312 includes a phone number and name entry 314 associated with the first incoming call.

Computing device 100 can receive device information 316 from display devices and user devices. Device information 316 can include information that identifies each respective display device and user device and information about the capabilities of each of the respective devices. In one embodiment, computing device 100 can receive device information 316 from display devices and user devices via short range communication device(s) 164. In another embodiment, computing device 100 can receive device information 316 from display devices and user devices via UWB transceiver 165. In one embodiment, device information 316 can include the unique identifier (e.g., device name or MAC address) of the display devices and user devices and can include extended display identification data (EDID) of each display.

User profiles 320 are information that identifies one or more users of computing device 100, display devices 180, 182 and user devices 186, 188. User profiles 320 comprise first user profile 322, second user profile 324 and third user profile 326. User profiles 320 can include various information such user account identification (i.e., name/username), user settings and/or preferences, and a phone number associated with each user profile.

System memory 120 further includes UWB ranging data 330 and device/tag identifiers 332. UWB ranging data 330 is received from UWB transceivers (e.g., UWB transceivers 165 and 181) and is data exchanged between two or more UWB transceivers that is used to determine specific locations of the UWB transceivers relative to each other. UWB ranging is done by performing time of flight (TOF), angle of arrival (AOA), and/or time difference of arrival (TDOA) measurements between the UWB transceivers. In one embodiment, UWB ranging data 330 can be used to determine a distance and direction between the UWB transceivers and locations of the UWB transceivers relative to each other. UWB ranging data 330 is used to calculate the precise location of computing device 100, display devices 180, 182 and user devices 186, 188 relative to each other in an environment (e.g., 101), which can then be used to enhance a wireless experience by routing incoming calls to the closest display device to a user. Device/tag identifiers 332 are received from UWB transceivers and UWB-enabled tags (e.g., UWB transceivers 181, 187 and tag 114). Device/tag identifiers 332 can identify display devices, user devices and tags that are exchanging UWB data with UWB transceiver 165.

System memory 120 further includes user device/tag locations 340 and display device locations 340. User device/tag locations 340 include first user device/tag location 342 corresponding to the location of first user device 186, second user device location 344 corresponding to the location of second user device 188 and third user tag location 346 corresponding to the location of UWB tag 114. User device/tag locations 340 are specific locations of one or more user devices 186, 188 and tag 114 relative to computing device 100 based on UWB ranging data 330. While two user device locations are shown in user device/tag locations 340, user device/tag locations 340 can contain the location of one or more than two user devices.

Display device/tag locations 350 include first display device location 352 corresponding to the location of first display device 180 and second display device location 354 corresponding to the location of second display device 182. Display device locations 350 are specific locations of one or more display devices 180, 182 relative to computing device 100 based on UWB ranging data 330. While two display device locations are shown in display device locations 350, display device locations 350 can contain the location of more than two display devices.

System memory 120 further includes closest display device 360 and next closest display device 362. Closest display device 360 is the display device that is identified as the closest to a user device. Next closest display device 362 is the display device that is identified as the next closest to a user device. In one embodiment, computing device 100 can calculate the distances between each display device and each user (or user device as a proxy) and identify, from among the several display devices, a display device that is closest to the location of the user 112 and within viewing area/range of user 112, based on the respective location of each of the plurality of display devices relative to the location of the user device. Computing device 100 can calculate the distances between each display device and each user based on user device/tag locations 340 and display device/tag locations 350.

System memory 120 further includes display device user profiles 370. Display device user profiles 370 include an identification of the current user profiles that are activated on or linked to each of the respective display devices. Display device user profiles 370 include first display device user profile 372 and second user profile 374, each of which can include the unique profiles of multiple users. For example, three different users have profiles set up on the first display device and can access and view content displayed on the first display devices. Two of the users may also have user profiles set up on the second display device, while the third user does not have a user profile set up on the second display device. An incoming call for each of the users can be routed to the first display if the first display is the closest to the respective user and is viewable by the respective user. An incoming call for the first two users can similarly be routed to the second display if the second display is the closest to and viewable by the first two users. However, an incoming call for the third user cannot be routed to the second display device even if the second display device is closest to and viewable by the third user.

System memory 120 further includes audio settings 232, smart speaker location 380 and environment mapping/layout 390. Audio settings 232 are audio operating parameters/characteristics that are received from a display device (e.g., first display device 180) or a smart speaker. Audio settings 232 can specify if the display device includes a speaker and microphone or if the display device has an audio accessory device such as a headset, ear-piece, or ear-buds currently enabled. Smart speaker location 380 is the location of a smart speaker relative to computing device 100 and/or display devices, based on UWB ranging data 330. Environment mapping/layout 390 includes a physical outline of the environment 101 where computing device 100, the display devices and user devices are located. In one embodiment, environment mapping/layout 390 can describe the physical locations of rooms, walls, windows, floors and ceilings within environment 101.

Figure 4:
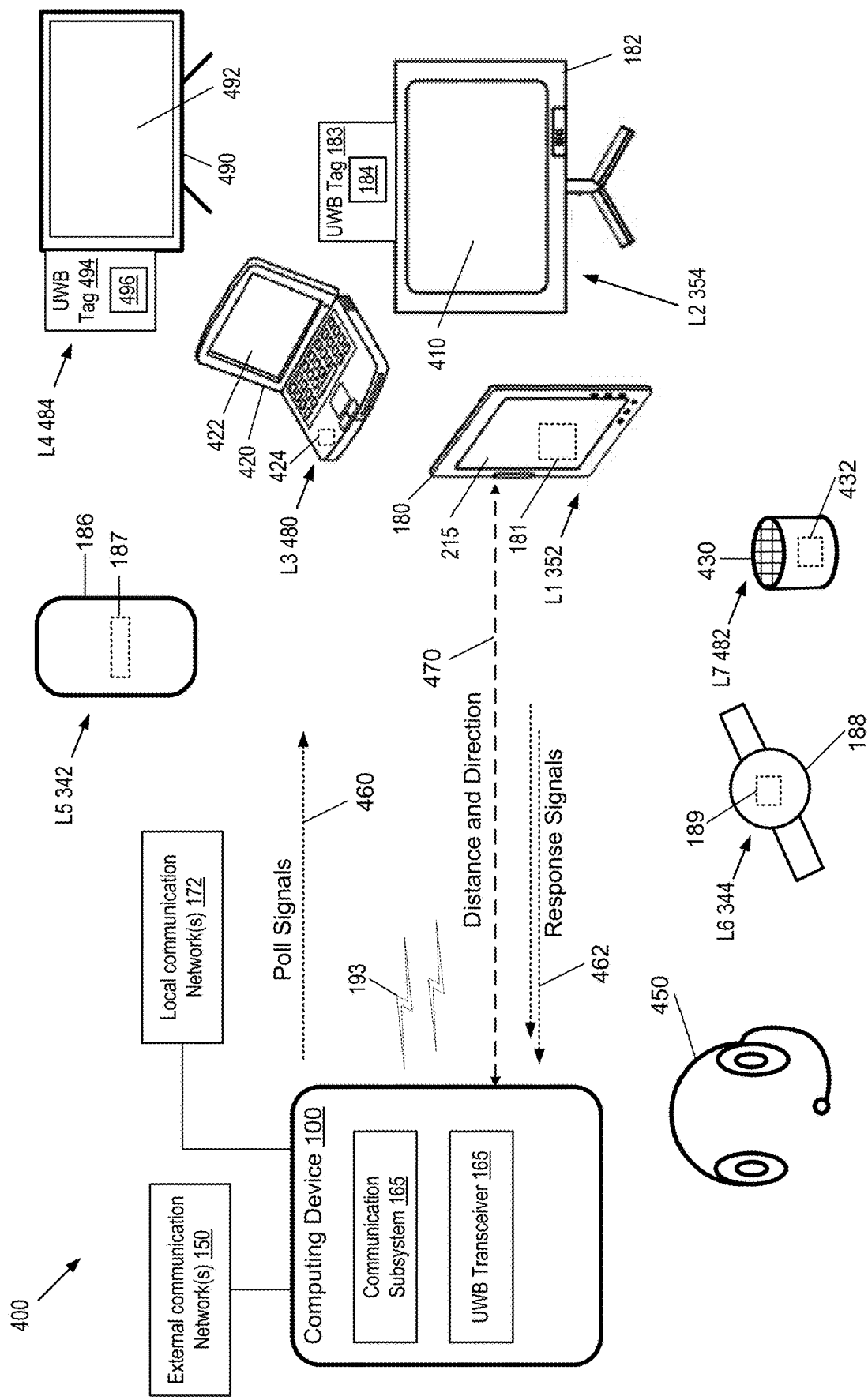
FIG. 4 is another example illustration of the ultra wideband environment of FIG. 1, having UWB-enabled computing devices communicating with several display devices and user devices using UWB transceivers to enable location determination, according to one or more embodiments.

Turning to FIG. 4, there is illustrated a distributed computing environment 400 in which computing device 100 is shown wirelessly exchanging UWB signals, via UWB transceiver 165, with respective UWB transceivers/tags of several display devices, user devices, and audio output devices, via UWB communication signals 193. The description of FIG. 4 includes reference to specific components and devices described within the preceding figure(s). In example embodiments, environment 400 can be a home environment, an office environment, or a business environment. Environment 400 includes first user device 186, illustrated as a mobile device with an integral UWB transceiver 187. Environment 400 further includes second user device 188, illustrated as a user-wearable device such as a smart-watch with a UWB transceiver 189.

Environment 400 further includes first display device 180, second display device 182, third display device 420 and fourth display device 490. First display device 180 is illustrated as a tablet computer and includes a display 215 and integrated UWB transceiver 181. Second display device 182 is illustrated as a monitor or smart display and includes display 410 and has an associated UWB tag 183 that is attached to or in proximity of second display device 182. UWB tag 183 is a separate device that can be attached to an article whose location is desired to be identified or tracked using UWB technology. UWB tag 183 includes a UWB transceiver 184. Third display device 420 is illustrated as a laptop computer and includes a display 422 and integrated UWB transceiver 424. Fourth display device 490 is illustrated as a television and includes display 492 and has an associated UWB tag 494 that is attached to or in proximity of fourth display device 490. UWB tag 494 includes a UWB transceiver 496.

Environment 400 further includes smart-speaker 430 and audio accessory device 450. Smart-speaker 430 includes an integrated UWB transceiver 432. Smart-speaker 430 includes a speaker and microphone and can wirelessly communicate with computing device 100. Smart-speaker 430 can play audio received from computing device 100, including audio of an incoming call routed to a separate display device. Audio accessory device 450 is illustrated as a headset. Audio accessory device 450 can also take other forms such as headphones, ear-phones and ear-buds. Audio accessory device 450 can wirelessly communicate with computing device 100. Audio accessory device 450 can play audio received from computing device 100, including audio of an incoming call routed to a separate display device.

Computing device 100 can further determine locations within environment 400 of each respective display device, each respective user device, and the smart-speaker relative to the location of computing device 100 based on UWB ranging data 330. According to one aspect of the disclosure, UWB transceiver 165 can transmit poll signals 460 to each respective UWB transceiver 181, 184, 187, 189, 424, 432, and 496 and receive response signals 462 from each respective UWB transceiver. In one embodiment, poll signals 460 can be transmitted via/as a single broadcast signal. According to one aspect of the disclosure, response signals 460 include UWB ranging data 330. Computing device 100 can determine a distance and direction coordinates 470 of first display device 180 from computing device 100, based on UWB ranging data 330. Similarly, computing device 100 can determine a distance and direction coordinates of each respective display devices 182, 420, 490, user devices 186, 188 and smart speaker 430 from computing device 100.

Accordingly, computing device 100 can determine that first display device 180 is located at first display device location L1 352, second display device 182 is located at second display device location L2 354, third display device 420 is located at display device location L3 480 and fourth display device 490 is located at display device location L4 484. Computing device 100 can determine that first user device 186 is located at first user device location L5 342 and second user device 188 is located at second user device location L6 344. Computing device 100 can further determine that smart-speaker 430 is located at location L7 482.

Figure 5B:
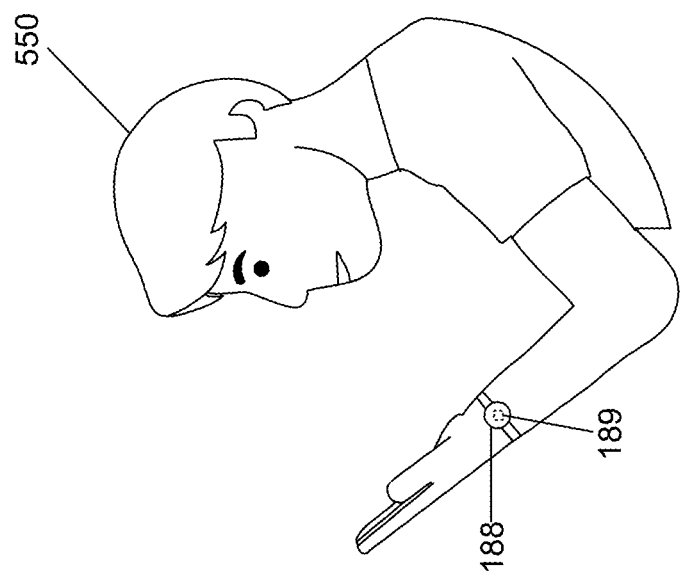
FIG. 5B is an example illustration of a UWB-enabled user wearable device being worn by a user, according to one or more embodiments.
Figure 5A:
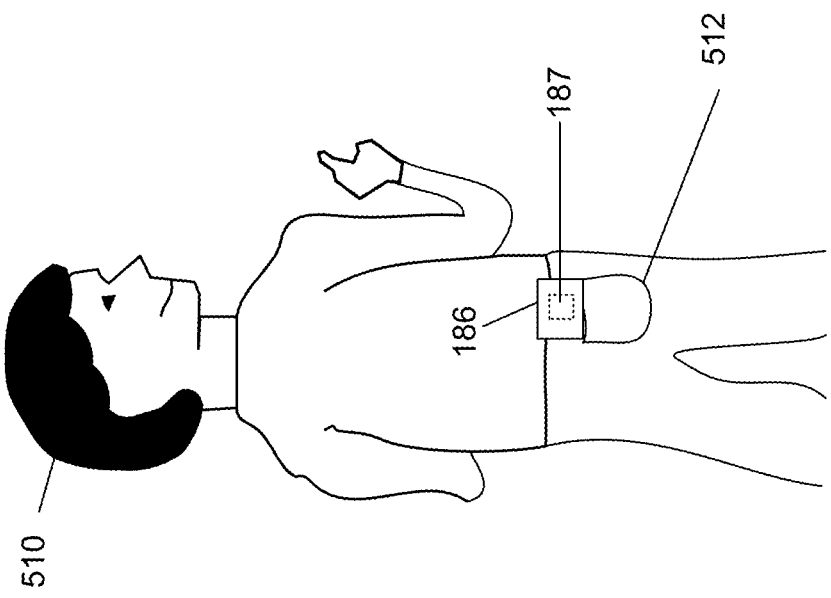
FIG. 5A is an example illustration of a user device having a UWB tag and located in a pocket of a user, according to one or more embodiments.

With reference to FIG. 5A, first user device 186 is shown located in a pocket 512 of a user 510. First user device 186 includes UWB transceiver 187. In one embodiment, UWB transceiver 187 can be integrated within first user device 186. In another embodiment, UWB transceiver 187 can be an electronic tag that is attached to, or in proximity to user 510 and/or first user device 186. Computing device 100 can receive UWB ranging data 330 from UWB transceiver 187 and determine a specific location of first user device 186 relative to computing device 100. When first user device 186 is located on or carried by user 510, computing device 100 can identify/track the location of user 510 as being at the same location as first user device 186.

Referring to FIG. 5B, second user device 188 is shown being worn by user 550. Second user device 188 is a UWB-enabled user wearable device and includes UWB transceiver 189. In an embodiment, UWB transceiver 189 can be integrated within second user device 188. In one embodiment, second user device 188 can be a smart-watch. Computing device 100 can receive UWB ranging data 330 from UWB transceiver 189 and determine a specific location of second user device 188 relative to computing device 100. When second user device 188 is worn or carried by user 550, computing device 100 can identify/track the location of user 550 as being at the same location as second user device 188. In an alternate embodiment, as illustrated by FIG. 1, the user may have a UWB tag 114 affixed to clothing or to an accessory worn by the user or in the possession (e.g., UWB tag 118 in the pocket) of the user. Computing device 100 can similarly identify/track the location of the user based on the location of the UWB tag.

Figure 6:
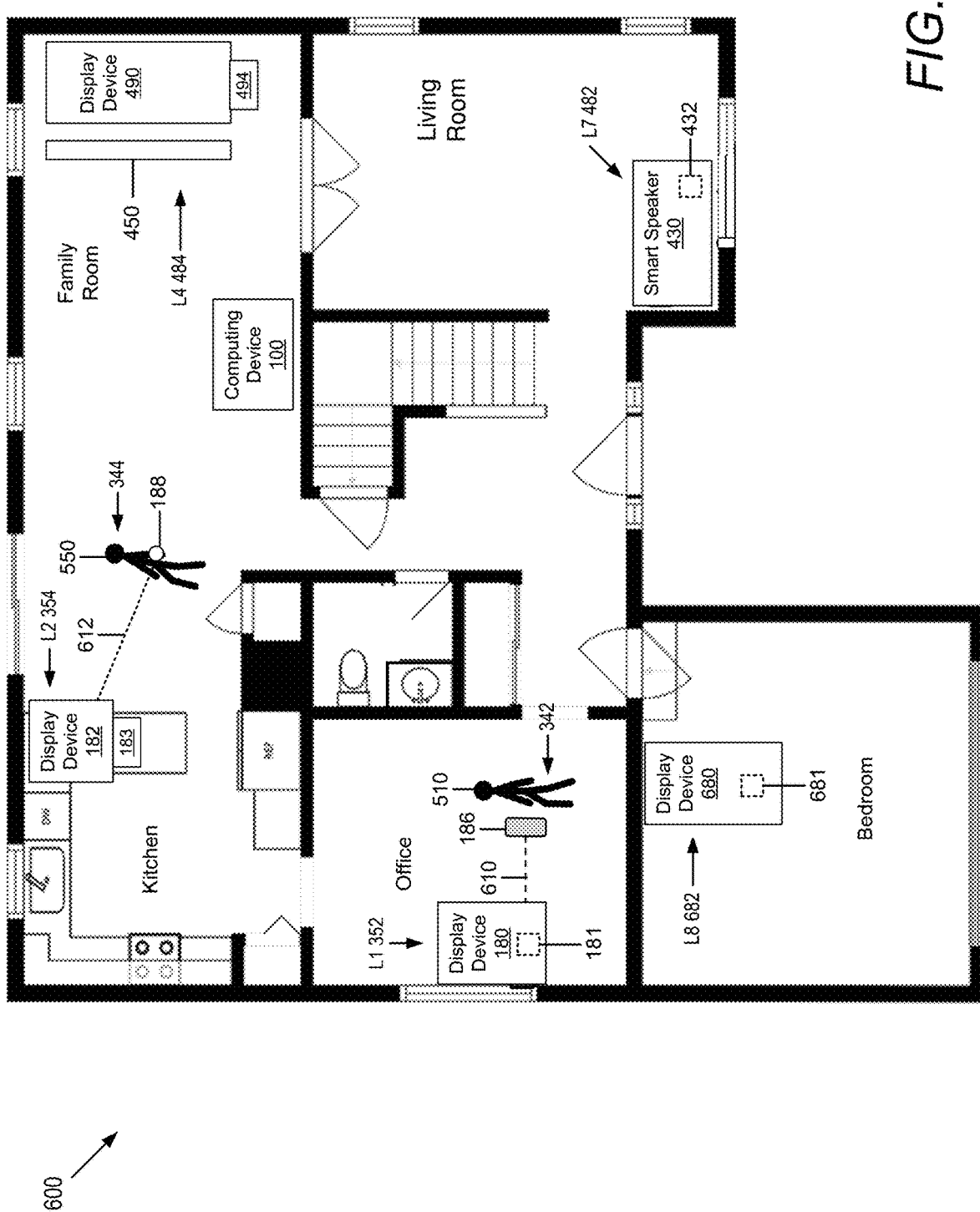
FIG. 6 illustrates an example of UWB ranging between a computing device and UWB tags/UWB-enabled devices for location determination in a home environment, according to one or more embodiments.

Referring to FIG. 6, there is shown one embodiment of a home environment 600 that includes UWB-enabled devices for location determination and call routing. Home environment 600 has a number of separate spaces, including a kitchen, an office, a living room and a family room. Computing device 100 is located in the family room. First display device 180 is located in the office, and second display device 182 is located in the kitchen. Fourth display device 490 is located in the family room, and smart speaker 430 is located in the living room. First user device 186 carried by user 510 is located in the office. Second user device 188 (i.e., a smart-watch) worn by user 550 is located in the kitchen.

Computing device 100 can determine locations within home environment 600 of each respective display device, each respective user device, and the smart-speaker, relative to the location of computing device 100, based on received UWB ranging data 330. Computing device 100 can determine that first display device 180 is located at first display device location 352, second display device 182 is located at second display device location 354, and fourth display device 490 is located at fourth display device location 484. Computing device 100 can determine that first user device 186 is located at first user device location 342 and second user device 188 is located at second user device location 344. Computing device 100 can further determine that smart-speaker 430 is located at location 482. Computing device 100 can further determine that first user device 186 is located a distance 610 from first display device 180 and second user device 188 is located a distance 612 from second display device 182.

When an incoming call 312 is received by computing device 100, computing device 100 first identifies that the first incoming call 312 is intended for first user 510. Computing device 100 can identify first display device 180 as the closest display device to first user 510, based on location of first user device 186, and computing device 100 determines if the first user profile 322, associated with the first user 510, is active on or linked to the closest display device 180. In FIG. 6, first display device 180 is shown as closest to first user device 186 in a space where first display device 180 is visible to first user 510.

In the illustration of FIG. 6, fifth display device 680 includes embedded ultra-wide band (UWB) device 681 and is located in the bedroom adjacent to the office. Third display device 680 is physically closer to user 510 and includes first user profile; however, third display device 680 is at a location L8 682 where the display device is separated from user 510 by the adjoining wall, such that the display device 680 is not visible to user 510. Based on a stored environment mapping/layout 390 of the home environment 600, computing device 100 determines fifth display device 680 is not a good candidate for routing the incoming call, and instead selects first display device 180, which is the second closest display device. In response to determining that the first user profile 322 is associated with the first user 510 and is active on or linked to the first display device 180, computing device 100 routes the incoming call 312 to the first display device 180. Computing device 100 can route the incoming call 312 to the first display device 180 using short range communication devices 164 and 240.

In an embodiment, computing device 100 is provided with structural/environment mapping/layout 390 of the home environment 600 to include walls or other barriers that divides the space, such that the identified closest display is a display that is closest within the same space (or room enclosure), as the user, and not the closest display located in a separate room/space from the location of the user, (e.g., where the user is physically closer to the display but is separated by a wall and so cannot view the display). Computing device 100 can identify the closest display device that is visible or viewable by a user, at least partially based on environment mapping/layout 390 of home environment 600.

In one embodiment, prior to or concurrently with routing the incoming call 312 to the first display device 180, computing device 100 can generate and transmit a wake-up event trigger to activate the first display device 180 to receive a cellular voice or video call. Computing device 100 can further trigger the first display device 180 to present an incoming call notification within a first graphical user interface (GUI) presented on the first display device 180 and trigger the first display device 180 to present an audio alert of the incoming call via speaker 222.

In another embodiment, with reference to second user 550, at second user location 344, in the extending open space connecting the family room and kitchen, computing device 100 can initially attempt to route an incoming call for the second user to the second display device 182; however, the second display device 182 may not have second user profile 324 installed or linked to the second display device. In response to determining that the second user profile 324 is not installed on the second display device 182, computing device 100 identifies, from among the plurality of display devices, a fourth display device 490 that is the next closest display device 362 to the second user location 344 of the second user 550 (i.e., second user device 188) and is visible to second user 550. In FIG. 6, fourth display device 490 is shown as next closest to second user device 188 within a viewable space proximate to second user 550. Computing device 100 determines if the first user profile 322, associated with the second user 550, is active on or linked to the fourth display device 490, and in response to determining that the first user profile, associated with the second user 550, is active on or linked to the fourth display device 490, computing device 100 routes the incoming call to the fourth display device 490. In one embodiment, the display device can generate/output an audible notification, via a speaker (e.g., speaker 222) of the display device, that an incoming call has been routed to the display device.

According to one aspect of the disclosure, CRM 130 enables computing device 100 to detect, via processor 102, an incoming call 312 and identify a first user 510 having a first user profile 322 associated with the incoming call. Computing device 100 determines, based on UWB ranging between computing device 100 and first user (via first user device 186 or UWB tag that is UWB-location-enabled, and that is on, or in proximity to, the first user 510), a first location 342 of the first user device 186 relative to a second location of the computing device. Computing device 100 determines, based on UWB ranging between computing device 100 and each of a plurality of display devices 180, 182, 420, and 490 that are UWB-location-enabled, a respective location of each of the plurality of display devices relative to the first location 342 of the user device. Computing device 100 identifies, from among the plurality of display devices, a first display device 180 that is closest to and viewable from the first location 342 of the user or user device/tag, based on the respective location of each of the plurality of display devices relative to the first location of the user device/tag. Computing device 100 determines if the first user profile 322 is supported by and is active on or linked to the first display device 180, and in response to determining that the first user profile 322 is supported by and is active on or linked to the first display device 180, computing device 100 routes the incoming call 312 to the first display device 180.

Figure 7A:
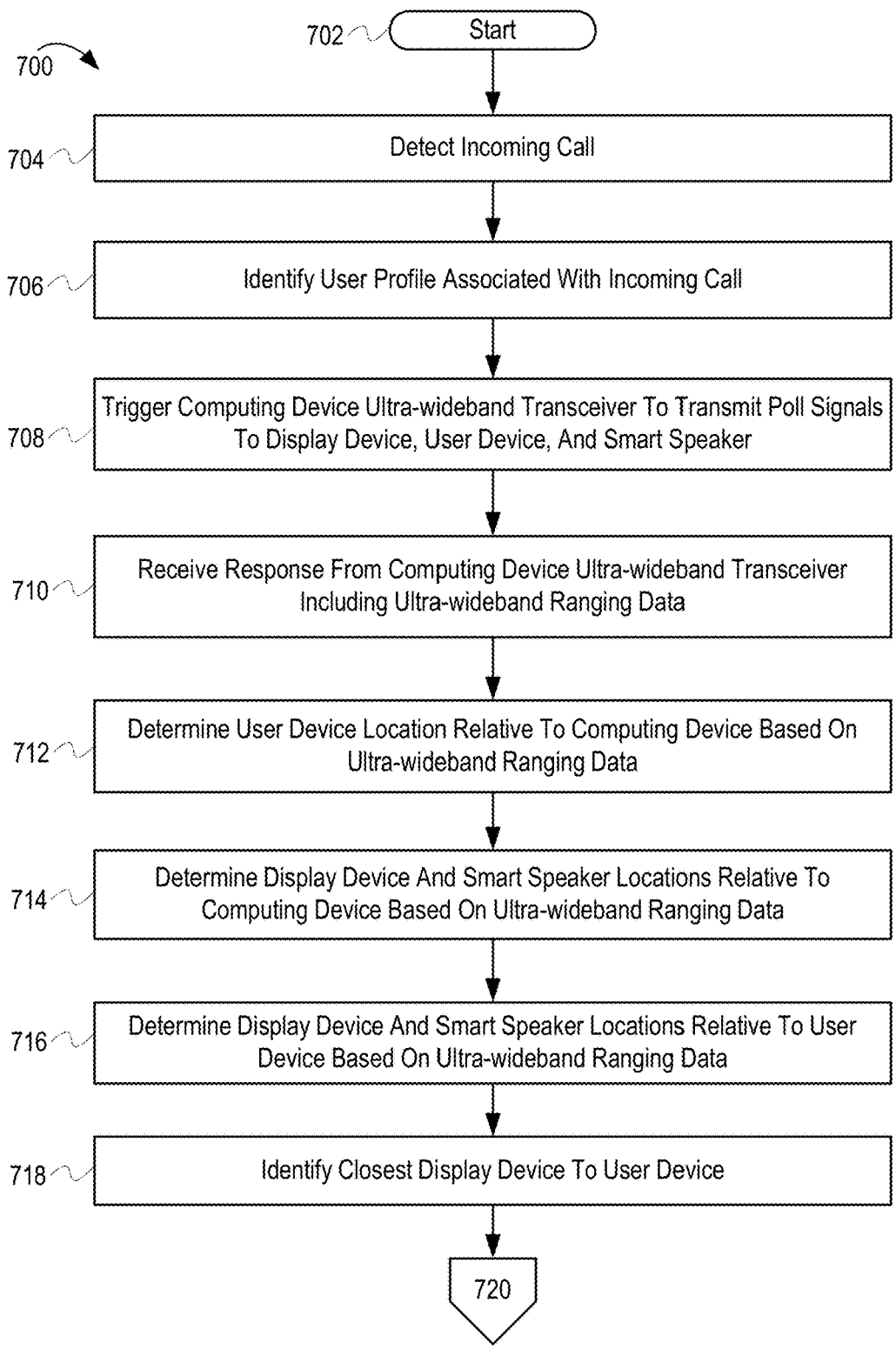
FIGS. 7A and 7B depict a flowchart of a method by which a computing device routes incoming calls received by the computing device to at least one display device that is closest to a user for whom the call is intended, according to one or more embodiments.
Figure 7B:
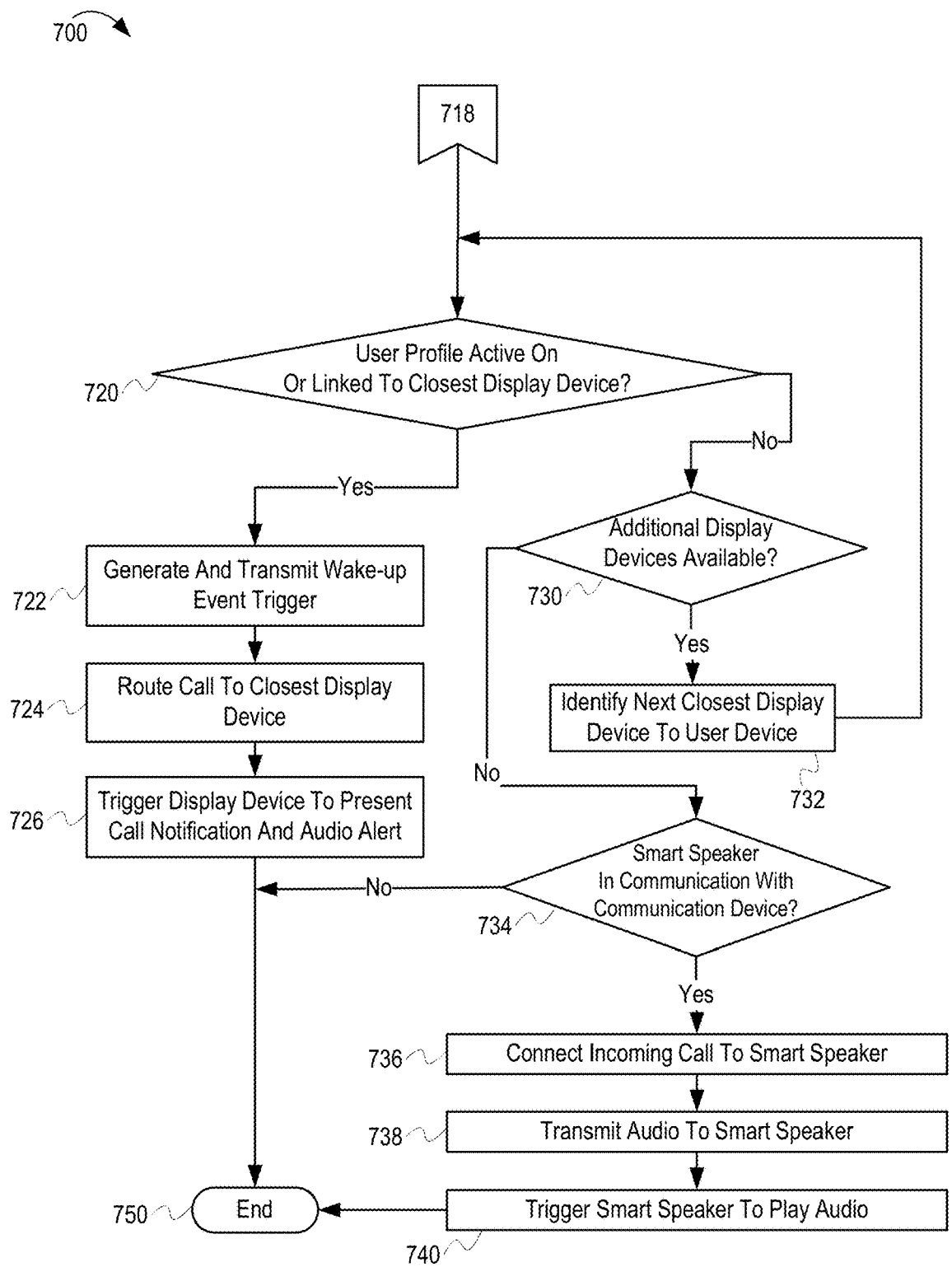
Figure 8:
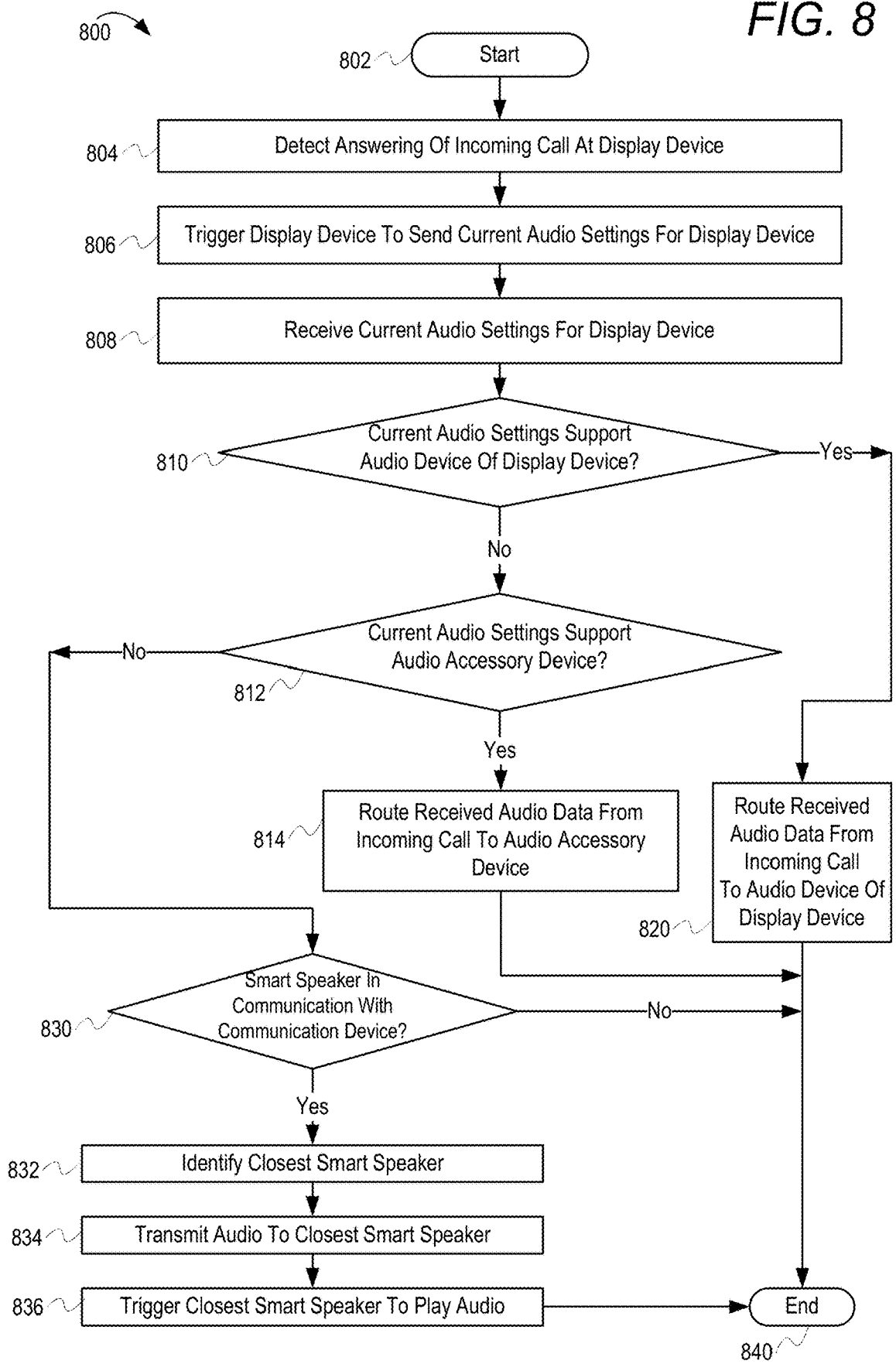
FIG. 8 depicts a flowchart of a method by which a computing device routes audio data to one of an audio device of a selected display device closest to the user or to an audio accessory device, according to one or more embodiments.

Turning now to the flow charts. FIGS. 7A-7B depicts method 700 by which computing device 100 identifies a closest viewable display device to a user and routes incoming calls received by the computing device to at least one display device that is the closest, viewable display device to the user. FIG. 8 depicts method 800 by which computing device 100 routes audio data to one of an audio device of a display device or to an audio accessory device that is in determined to be proximity to the user receiving the incoming call. The description of methods 700 and 800 will be described with reference to the components and examples of FIGS. 1-6.

The operations depicted in FIGS. 7A-7B and 8 can be performed by computing device 100 or any suitable computing device that includes the one or more functional components of computing device 100 that provide/enable the described features. One or more of the processes of the methods described in FIGS. 7A-7B and 8 may be performed by processor 102 executing program code associated with CRM 130.

With specific reference to FIG. 7A, method 700 begins at start block 702. At block 704, a first incoming call 312 is detected. Computing device 100 can receive incoming calls via WCS 142 from network 150 or via short range communication device 164 from WiFi router 196. Method 700 includes identifying a first user 510 having a first user profile 322 associated with the incoming call (block 706) and triggering computing device UWB transceiver 165 to transmit polling signals 460 to each respective UWB transceiver

181, 184, 187, 189, 424, 432, and 496 (block 708). UWB transceiver 165 receives response signals 462 from each respective UWB transceiver 181, 184, 187, 189, 424, 432, and 496, including UWB ranging data 330 and device/tag identifiers 332. Method 700 includes processor 102 receiving UWB ranging data 330 and device/tag identifiers 332 from UWB transceiver 165 (block 710).

At block 712, method 700 includes determining the locations (i.e., user device locations 340) of user devices 186 and 188 relative to computing device 100, based on UWB ranging data 330 and device/tag identifiers 332. Method 700 includes determining the locations (i.e., display device locations 350) of each display device 180, 182, 420, 490, and smart-speaker 430 relative to computing device 100, based on UWB ranging data 330 and device/tag identifiers 332 (block 714). Method 700 includes determining the locations of each display device 180, 182, 420, 490, and smart-speaker 430 relative to user devices 186 and 188 (or UWB tags) based on the determined user device locations 340, display device locations 350, and UWB ranging data 330 (block 716). At block 718, method 700 includes identifying, from among the plurality of display devices, display device 180 as the closest display device 360 to the location 342 of the user device 186 based on the respective location of each of the plurality of display devices relative to the location of the user device. In one or more embodiments, method 700 also includes identifying the closest display device that is also viewable to the user within the location.

Turning to FIG. 7B, at decision block 720, method 700 includes determining if the first user profile 322 is active on or linked to the closest display device 360 (i.e., display device 180). In response to determining that the first user profile 322 is active on or linked to the closest display device, method 700 includes generating and transmitting a wake-up event trigger to activate the display device 180 to receive the incoming cellular voice or video call (block 722). Method 700 includes routing the incoming call 312 to display device 180 (block 724). Method 700 includes triggering display device 180 to present an incoming call notification within a first graphical user interface (GUI) presented on display device 180 and triggering display device 180 to present an audio alert of the incoming call via speaker 222 (block 726). Method 700 ends at end block 750.

In response to determining that the first user profile 322 is not running on the closest display device, method 700 includes determining if any additional display devices are available to route the incoming call 312 to (decision block 730). In response to determining that additional display devices are available, method 700 includes identifying, from among the plurality of display devices, a next closest display device 362 (i.e., display device 182) to the location of the user (e.g., the user device 186) and is visible to the user (block 732). Method 700 includes returning to decision block 720 to continue determining if the first user profile 322 is running on the next closest display device 362 (i.e., display device 182).

In response to determining/identifying that additional display devices are not available to accept the incoming call among the plurality of display devices, method 700 includes determining if a smart-speaker 430 is in communication with computing device 100 (decision block 734). In response to determining that a smart-speaker 430 is not in communication with computing device 100, method 700 terminates at end block 750.

In response to determining that a smart-speaker 430 is in communication with computing device 100, method 700 includes connecting the incoming call 312 to smart-speaker 430 (block 736), transmitting audio of the incoming call to the smart-speaker 430 (block 738), and triggering the smart-speaker 430 to play the audio of the incoming call (block 740). Method 700 then ends at end block 750.

Referring to FIG. 8, method 800 begins at start block 802. At block 804, method 800 includes detecting answering of the incoming call 312 at display device 180. Method 800 includes triggering display device 180 to send current audio settings 232 for the display device (block 806) and receiving the current audio settings 232 for the display device (block 808). At decision block 810, method 800 includes determining if the current audio settings 232 include receiving incoming audio on and presenting outgoing audio at an audio device 220 of display device 180. In response to determining that the current audio settings 232 include receiving incoming audio and presenting outgoing audio on the audio device 220 of display device, method 800 includes routing received audio data from the incoming call to the audio device 220 (block 820). Method 800 ends at end block 840.

In response to determining that the current audio settings 232 do not include receiving incoming audio and presenting outgoing audio on the audio device 220 of display device, method 800 includes determining if the current audio settings 232 support receiving incoming audio and presenting outgoing audio at an audio accessory device 450 (decision block 812).

In response to determining that the current audio settings 232 support receiving incoming audio and presenting outgoing audio on audio accessory device 450, method 800 includes routing received audio data from the incoming call 312 to the audio accessory device 450 (block 814). Method 800 then ends at end block 840.

In response to determining that the current audio settings 232 do not support receiving incoming audio and presenting outgoing audio on audio accessory device 450, method 800 includes determining if at least one smart-speaker 430 is in communication with computing device 100 (decision block 830). In response to determining that there is no smart-speaker 430 in communication with computing device 100, method 800 terminates at end block 840. In response to determining that at least one smart-speaker 430 is in communication with computing device 100, method 800 includes identifying, based on UWB ranging data 330, a smart-speaker that is closest to display device 180 where the incoming call was answered (block 832). Method 800 includes transmitting audio of the incoming call to the identified closest smart-speaker 430 (block 834), and triggering the smart-speaker 430 to play the audio of the incoming call (block 836). Method 800 ends at end block 840.

In the above-described methods of FIGS. 7A-7B and 8, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A computing device comprising:
   a communication subsystem;
   a first ultra-wideband (UWB) transceiver;
   a memory having stored thereon a call routing module for routing incoming calls received by the computing device to at least one UWB enabled display device; and
   at least one processor communicatively coupled to the communication subsystem, the first UWB transceiver, and the memory, the at least one processor executing program code of the call routing module, which enables the computing device to:
      detect an incoming call;
      identify a first user having a first user profile associated with the incoming call;
      determine a first location of the first user relative to a second location of the computing device, based on UWB ranging between the computing device and at least one of a user-associated UWB tag or a user device that is UWB-location-enabled and is on, or in proximity to, the first user;
      determine, based on UWB ranging between the computing device and each of a plurality of display devices that are UWB-location-enabled, a respective location of each of the plurality of display devices relative to the first location of the user device;
      identify, from among the plurality of display devices, a first display device that is closest to the first location of the first user, based on the respective location of each of the plurality of display devices relative to the first location of the first user;
      determine if the first user profile is active on the first display device; and
      in response to determining that the first user profile is active on the first display device, route the incoming call to the first display device.

2. The computing device of claim 1, wherein in response to determining that the first user profile is not active on the first display device, the at least one processor:

identifies, from among the plurality of display devices, a second display device that is in next closest visual proximity to the first location of the user device;

determines if the first user profile is active on the second display device; and in response to determining that the first user profile is active on the second display device, routes the incoming call to the second display device.

3. The computing device of claim 1, wherein the at least one processor:

generates and transmits a wake-up event trigger to activate the first display device to receive a cellular voice or video call.

4. The computing device of claim 1, wherein the at least one processor:

triggers the first display device to present an incoming call notification within a first graphical user interface (GUI) presented on the first display device.

5. The computing device of claim 1, wherein the at least one processor:

triggers the first display device to present an audio alert of the incoming call via a first speaker of the first display device.

6. The computing device of claim 1, wherein the at least one processor:

receives location information corresponding to each of the plurality of display devices based on the location of respective UWB devices associated with each of the plurality of display devices.

7. The computing device of claim 6, wherein at least one of the respective UWB devices is a UWB tag that is located with the first display device.

8. The computing device of claim 1, wherein the at least one processor:

in response to identifying that no display devices are available to accept the incoming call among the plurality of display devices:

identifies a smart speaker communicatively coupled to the computing device;

connects the incoming call to the smart speaker;

transmits audio of the incoming call to the smart speaker; and triggers the smart speaker to play the audio of the incoming call.

9. The computing device of claim 1, wherein the at least one processor:

receives first location information of the user device from a UWB transceiver integrated within at least one of (i) a user-wearable device (UWD) and (ii) a UWB tag.

10. The computing device of claim 1, wherein the at least one processor:

detects answering of the incoming call at the first display device;

triggers the first display device to send current audio settings for the first display device;

receives the current audio settings from the first display device;

determines if the current audio settings include receiving incoming audio and presenting outgoing audio at a first audio accessory device; and in response to determining that the current audio settings include receiving incoming audio and presenting outgoing audio on the first audio accessory device, routes received audio data from the incoming call to the first audio accessory device.

11. The computing device of claim 1, wherein the at least one processor:

detects answering of the incoming call at the first display device;

triggers the first display device to send current audio settings for the first display device;

receives the current audio settings from the first display device;

determines if the current audio settings include receiving incoming audio on and presenting outgoing audio at an audio device of the first display device; and in response to determining that the current audio settings include receiving incoming audio and presenting outgoing audio on the audio device of the first display device, routes received audio data from the incoming call to the audio device.

12. A method comprising:

detecting, via at least one processor of a computing device, an incoming call;

identifying a first user having a first user profile associated with the incoming call;

determining a first location of the first user relative to a second location of the computing device, based on ultra-wideband (UWB) ranging between the computing device and at least one of a user-associated UWB tag or a user device that is UWB-location-enabled, and is on, or in proximity to, the first user;

determining, based on UWB ranging between the computing device and each of a plurality of display devices that are UWB-location-enabled, a respective location of each of the plurality of display devices relative to the first location of the user device;

identifying, from among the plurality of display devices, a first display device that is closest to the first location of the first user, based on the respective location of each of the plurality of display devices relative to the first location of the first user;

determining if the first user profile is active on the first display device; and in response to determining that the first user profile is active on the first display device, routing the incoming call to the first display device.

13. The method of claim 12, wherein in response to determining that the first user profile is not active on the first display device, the method further comprises:

identifying, from among the plurality of display devices, a second display device that is in next closest visual proximity to the first location of the user device;

determining if the first user profile is active on the second display device; and in response to determining that the first user profile is active on the second display device, routing the incoming call to the second display device.

14. The method of claim 12, further comprising:

generating and transmitting a wake-up event trigger to activate the first display device to receive a cellular voice or video call.

15. The method of claim 12, further comprising:

triggering the first display device to present an incoming call notification within a first graphical user interface (GUI) presented on the first display device.

16. The method of claim 12, further comprising:

receiving location information corresponding to each of the plurality of display devices based on the location of respective UWB devices associated with each of the plurality of display devices.

17. The method of claim 16, wherein at least one UWB device is a UWB tag that is located with the first display device.

18. The method of claim 12, further comprising:
in response to identifying that no display devices are available to accept the incoming call among the plurality of display devices:
identifying a smart speaker communicatively coupled to the computing device;
connecting the incoming call to the smart speaker;
transmitting audio of the incoming call to the smart speaker; and
triggering the smart speaker to play the audio of the incoming call.

19. The method of claim 12, further comprising:
receiving first location information of the user device from a UWB transceiver integrated within at least one of (i) a user-wearable device (UWD) and (ii) a UWB tag.

20. A computer program product comprising:
a computer readable storage device having stored thereon program code which, when executed by at least one processor of a computing device having a communication subsystem, a first ultra-wideband (UWB) transceiver, and a memory, enables the computing device to complete the functionality of:
detecting an incoming call;
identifying a first user having a first user profile associated with the incoming call;
determining a first location of the first user relative to a second location of the computing device, based on UWB ranging between the computing device and at least one of a user-associated UWB tag or a user device that is UWB-location-enabled, and is on, or in proximity to, the first user;
determining, based on UWB ranging between the computing device and each of a plurality of display devices that are UWB-location-enabled, a respective location of each of the plurality of display devices relative to the first location of the user device;
identifying, from among the plurality of display devices, a first display device that is closest to the first location of the first user, based on the respective location of each of the plurality of display devices relative to the first location of the first user;
determining if the first user profile is active on the first display device; and
in response to determining that the first user profile is active on the first display device, routing the incoming call to the first display device.

* * * * *